United States Patent Office 3,270,825
Patented Sept. 6, 1966

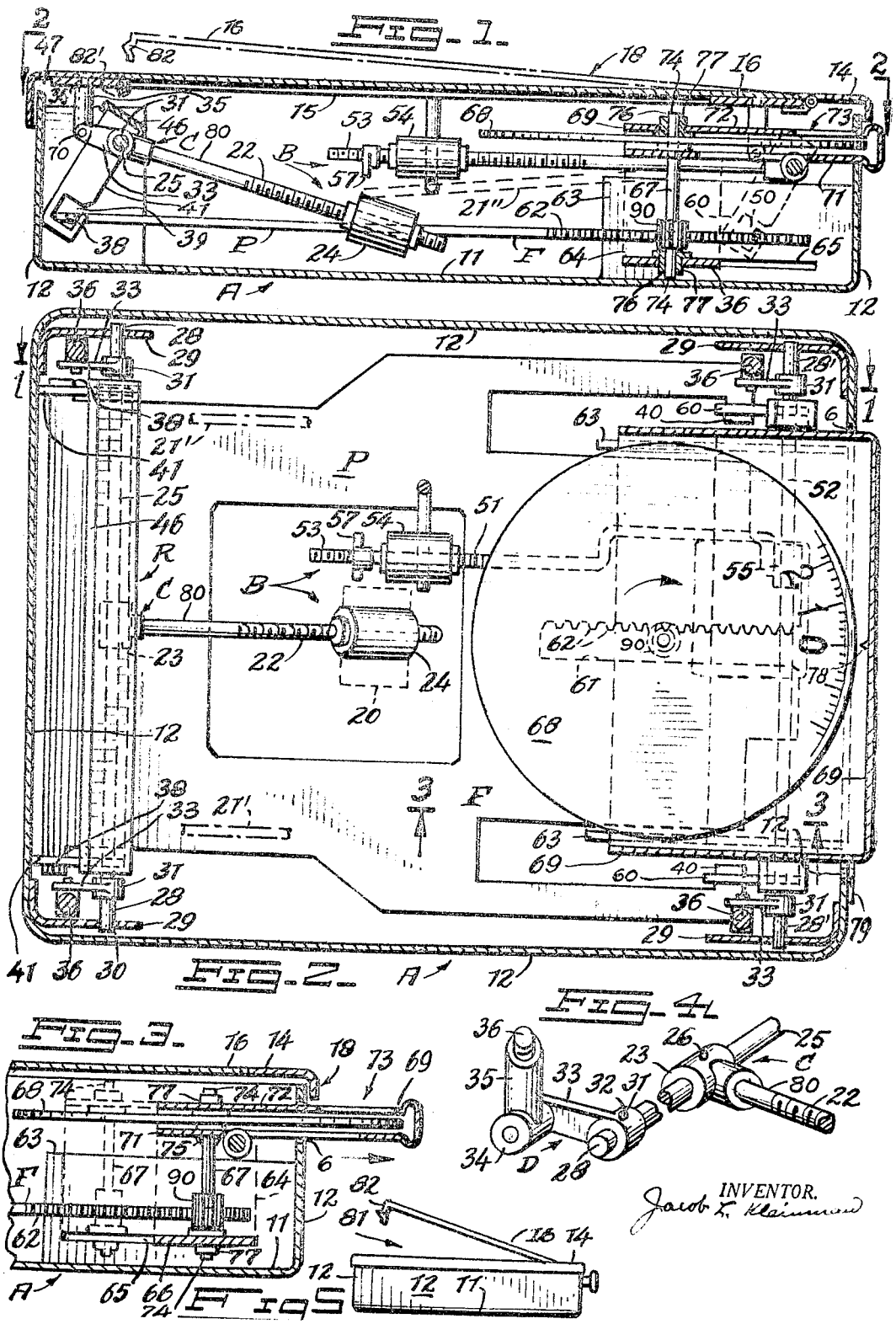

3,270,825
SPRINGLESS ADJUSTABLE SCALE STRUCTURE
Jacob L. Kleinman, Hotel Kimberly, 203 W. 74th St., New York 23, N.Y.
Filed Jan. 11, 1965, Ser. No. 424,526
18 Claims. (Cl. 177—217)

This invention relates to the construction of scales in general, and more particularly so to scales known as bathroom scales, and is filed as a continuation in part of my copending application S.N. 263,470, filed March 7, 1963; which was filed as an improvement and a continuation in part of my then pending application S.N. 707,027, for adjustable illuminating scale structure, filed on January 3, 1958, now Patent No.3,101,831.

In accordance with my present invention, I produce a scale structure having a dial unit provided with weight-indicating means, and wherein such dial unit may be movable into a position partly locatable exteriorly of its casing, to facilitate reading of the weight-numerals arranged upon such dial, and being revertable into its normal position within its casing, and wherein the top-section of the scale comprises a floatable platform for being moved out of its normal position to uncover the mechanism and provide access into the interior of the scale structure for adjusting the weight-elements into desired positions, and wherein the weight elements may be movably adjustable into various locations for obtaining desired results, and wherein such weight-elements are arranged for weighing purposes without the use of yieldable means or of spring elements. It is thus:

A primary object of the present invention is the provision of means for adjusting the weighing arrangements located within the casing for desired weighing purposes;

A very important object of this invention is the provision of a pocket member carrying a rotatable dial and being movable out of its normal position within its casing towards a frontward direction and being revertable into normal position within such casing;

Another important object of this invention is the provision of a slot formed in the front portion of the casing for having a portion of the dial-carrying pocket moved slidably therethrough to a position exteriorly of such casing and for reverting such pocket into normal position within its casing;

A very important object of this invention is the provision of numerals formed upon the rotatable dial and having the upper face of the dial-carrying pocket provided with a window opening for exposing certain of such numerals of the dial structure during weighing operation, and means for indicating the proper weight-numerals;

Another very important object of this invention is the provision of means for adjusting the tension of the weighing mechanism to various degrees in weight;

Yet a very important object of this invention is the provision of a weighing mechanism operable without the use of yieldable means or of springs;

And another very important object of this invention is the provision of movable adjustment of certain of the parts of the weighing mechanism into desirable locations within its casing;

And a very important object of this invention is the provision of a floatable weighing-platform being movable to uncover the upper portion of the casing to provide access into such casing for adjustment of the mechanism located therein.

These and various other objects and features of the present invention will become apparent from the following description relating to the accompanying drawing, wherein one form of the invention is illustrated, and wherein the accomplishment of the above and other objects of the invention will be readily understood on references to the herein, wherein:

FIG. 1 is a cross-sectional view taken along the line 1—1 of FIG. 2, showing the weighing mechanism in normal non-weighing position, also showing the floatable platform carried by the frame structure of the casing;

FIG. 2 is a cross-sectional top view taken along the line 2—2 of FIG. 1, showing the location of the weighing mechanism within the casing;

FIG. 3 is a cross-sectional view taken along the line 3—3 of FIG. 2, showing a portion of the pocket and dial structure located in a position exteriorly of the casing;

FIG. 4 is a fragmental view showing a portion of the weighing mechanism; and

FIG. 5 is a side view of the scale, showing the floating platform structure in a partly open position for providing access to adjust the weighing mechanism located within the casing.

I am showing the several figures or views of my invention by way of example, for illustrative purposes and for a better and clearer understanding of my invention, and not for limitation purposes.

The size of the parts shown in the drawing herein, and the spacing therebetween, is exaggerated for clarification purposes, and for easier understanding.

Referring more particularly to the drawing, in which similar reference characters identify similar parts in the several views, in the novel structure of my invention:

Arrow A indicates the casing of my scale structure having a floor or base section 11 provided with upwardly extending wall portions 12. The upper portion of the casing A is provided with a frame structure 14 having a spaced section or opening 15 (FIG. 1), such frame 14 is carrying a movable or hingeable plate 16 and in combination therewith forming a floatable platform indicated by arrow 18, as will be hereinafter explained.

The interior of the casing A is provided with a weighing mechanism comprising weighing members indicated by arrows B. One of these weighing members comprises a shaft 21 having a screw-threaded section 22 for carrying thereon a movable or rotatable member 24. This shaft 21 may be provided with an element of a type for example as indicated by arrow C (FIG. 4). Such element C may be provided with an opening or bushing 23 adapted to fit upon a bar-element 25 and be secured rigidly thereto by suitable means, for example a rivet or screw element 26. The end portions 28 of the bar-element 25 are carried in a pivotal manner by the wall sections or flange portions 29 for example, as shown at numeral 30. Such end portions 28 are each provided with a structure of a type as indicated by arrow D. Each of the structures D having a section 31 for being carried by each of the end portions 28 and secured thereto by securing means 32 similar to that indicated by numeral 26. Such sections 31 each having an extended portion 33. Each of such portions 33 is secured to a bushing 34. Such bushing 34 having an extending section 35 (FIGS. 1 and 4) provided with a screw-threaded opening for receiving therein a screw-element 36 extending from the floatable structure 14 for uniting or securing such floatable structure 14 with the section 35. The flange portions 29 may each be secured to the base 11 or wall portions 12 of the casing A by suitable means, for example, welding or riveting.

An element or plate-structure P is located underneath the weighing member B, having its end portion 46 connected in a pivotal manner to the portion 39 of the members 41 for example as shown at 38; such members 41 are each secured rigidly in suitable position upon the bar member 25. The extending portion 33 and the extending section 35 may be connected to each other by pivotal means, for example, as indicated by numeral 70 and be urged towards various directions.

The front portion F of the element P is provided with suitable means, for example lug portions 40 arranged freely within openings 50 of the members 60 (FIGS. 1 and 2). Such members 60 are similar in shape to that of members 41, and are carried by the bar-element 52 and assembled in combination with the floatable structure 14 practically in the same manner as referred to the rear portion of the mechanism indicated by arrow R.

In normal non-weighing position the weight-member 24 will be located or rest upon the floor 11 of casing A, holding the frame 14 including the plate 16 in an upright or floating position, spaced away from the walls 12 forming a floatable platform as shown at 47 (FIG. 1); and simultaneously therewith holding the member 41 and the plate P in a position located in the rear of such casing A; whereas, during weighing operation such floating structure will be urged downwardly, pressing upon the portions 33, causing the bar-element 25 to rotate within the openings 30 of the flange portions 29, lifting the weight-member 24 from its normal position, and causing the member 41 to urge the plate P towards a position frontwardly of the casing A for weighing purposes; the weight-member 24 may be moved or rotated upon the section 22 towards either direction for adjusting the weighing tension of the weighing mechanism to desired degree.

The weighing implement consisting of the bar-element or shaft 21 and the movable member 24 may each be positioned in any desirable location; for example, centrally located as shown in FIG. 2, and may be formed of a shape wherein the member 24 would not be held thereon in a rotatable manner but just be movable longitudinally thereon and be secured in desired position by suitable means; or such member 24 may be shaped or formed into a wider size cross-sectionally of the casing A, as indicated, for example, by the dotted lines 20; or several of such weight-members 24 may be utilized in connection with the section 21; or a plurality of such sections 21 may be carried by the bar-element 25, each suitably located upon such bar 25, for the purpose of adjusting the weighing mechanism to desired degree of weighing tension.

The shaft-structure 51 (FIG. 2) is carried loosely by the front-bar 52, in a manner being movable thereon into various directions. The extention 53 of such shaft 51 and the weight-member 54 may be constructed in practically the same manner as explained in connection with the shaft 21 and the weighing means thereon; with the exception that whereas, the shaft 21 is secured rigidly upon the bar-element 25; in this instance, the shaft-structure 51 is carried by the front-bar 52 in a manner whereby the section 55 may be movable upon such front-bar 52 into various locations; into a position whereby the weight-member 54 may be adjusted to be placed upon or overlap the member 24, or upon the shaft 80 as indicated by dotted lines 21″, serving as auxiliary weighing means for increasing the weighing tension of the weighing mechanism. Naturally, if desired, such section 55 may be secured rigidly directly to the front-bar 52, and such bar 52 may be movable within openings formed in the flange portions 29, in a manner providing desirable weighing tension. Naturally, several of such weighing structures (shaft 51 and member 54) may be utilized if so desired. The extension 53 of the shaft 51 may be provided with suitable means for riding upon the shaft 21 or member 24 during weighing operation; for example, a forked or winglike structure as indicated by numeral 57, or if desired such shaft 51 may be spaced away from member 24 and operate independently for weighing purposes for example as indicated in FIG. 2.

The front portion F of the plate P is provided with an opening or slot 6, wherein one of the side portions is provided with teeth sections or teeth elements 62. The floor section 11 of the casing A is provided with two facing wall sections 63 adapted to support a movable carrier 64 (FIG. 3). The wall sections 63 are each provided with slots 65 for housing therein floor portions 66 of the carrier 64 in a manner whereby such carrier 64 may be slidably moved frontwardly or rearwardly within the casing A; or other suitable means may be provided for such purposes.

The carrier 64 is carrying a rotatable member 67 which is provided with a toothed wheel 90 for engagement with the teeth sections 62 of the plate 7, and is also provided with a shoulder portion 75, for supporting a receptacle or pocket 69, having a dial structure 68 located therein. The carrier 64 and the pocket 69 and dial 68 have aligned openings for having the end portions of the member 67 located therein. The openings in the floor portion 66 and in the section 72 of the pocket 69 are each provided with bushings 77 having openings 76 for housing therein the end portions 74 of the member 67 in a rotatable manner; the dial 68 is located between the sections 71 and 72 of the pocket or receptacle 69 and is secured rigidly in its position upon the member 67, for free rotation within such pocket 69, to disclose its numerals through the window opening (indicated by arrow 73) of the pocket 69.

It will be seen that the pocket structure including the member 67 and carrier 64 are located within the casing A in a cooperative manner with the weighing mechanism B. While in normal non-weighing position, the weighing members B will rest upon the floor 11, and the pocket structure 69 will be located above such members B. Whereas, for weighing purposes, the pocket structure 69 is first moved frontwardly through the slot 61 for bringing the window opening 73 exteriorly of the front portion of the casing A, for the full utilization of the floating or weighing platform and to facilitate the reading of the weight-numeral. During such movement the member 67 will rotate by reason of the teeth sections 62 of the slots 61 carrying therewith the dial structure 68 until the pocket 69 will be located in desired position, at which time the pointer 78 will indicate the letter O upon the dial 68, indicating readiness for weighing purposes. Such pocket structure may be held in desired position by a movable or pivotal element, for example such as indicated by numeral 79, or by other suitable means.

The floatable platform or plate 16 may be moved or swung out of normal closed position as indicated, for example, by arrow 81 (FIG. 5), for providing access to the interior of the casing A to adjust the weighing mechanism located therein, or for replacing parts thereof. Such plate 16 is provided with a suitable hook-structure 82, or other suitable means, for being held in normal closed position.

My invention may be utilized in the following manner:

The weighing mechanism may be positioned into the casing A in a manner as above described. The weight-elements may be adjusted in a manner suitable for various types of scale utilization; for light weighing purposes, or standard weight, or for heavier weighing purposes. The portion covering the opening of the floatable section may be removed by the user for adjusting the weight-tension of such mechanism, and be replaced to cover such opening for weighing purposes. Such floatable section being clear of weighing numeral obstructions facilitates utilization of the full floatable platform for weighing operation. The weight-indicating numerals being available at the exterior of the casing A facilitates the reading of the numerals during weighing operation.

Although I am showing one type of scale structure, yet,

I am aware of the fact that parts of my present invention may be utilized in connection with various types of scale structures, and I therefore desire it to be clearly understood that my disclosures herein are for illustrative purposes only, and not for limitation purposes. Various forms of structure may be resorted to, for example, the springless structure, or the carrier 64, or the rotatable member 67, or the pocket and dial structure, or the arrangements of same within the casing, may be differently constructed or arranged, and yet be part of this invention and covered by the disclosures or claims herein.

It can thus be seen that I have invented and perfected a scale structure of a new and unique form of mechanical combination; my present invention teaches an entirely new way of assembling parts into construction of weighing scales to obtain results not known heretofore; a new combination of parts for performing new and desirable functions; a weighing scale which is a practical and useful structure; a scale structure which has no springs or yieldable elements in its mechanism, and can therefore provide practically correct weight; a scale structure which can be manufactured at a reasonable cost and therefore may be made available to the average user; and although I have shown certain preferred forms or illustrations in order to explain and describe the novelty of my invention, yet, by showing such structure, I do not, by any means, limit myself to these structures, nor to the terms used in describing same, as they are for illustrative purposes only. Various suggestions and changes of structure to bring about the functions herein-above referred to may be resorted to, and I desire it to be understood that I have same in mind when showing and describing this invention, and seek protection by Letters Patent. And although I mentioned in describing this invention of what material certain parts may be made, how they may be formed, shaped or styled, and how they may be assembled, yet I desire it to be understood that this structure, or individual units, or parts thereof, may be made of any suitable material, and shaped, formed, styled or arranged in any suitable or desirable manner, and assembled in any convenient way, and that various changes may be resorted to without departing from the spirit of this invention.

I claim:

1. A scale structure comprising a casing, said casing having a base portion and a front section, said front section having a slot, a member having a pocket structure, the front portion of said pocket structure having a window opening, said member positioned normally within the said casing having its said front portion located within the said slot, a part of said front portion extending exteriorly of said slot and providing gripping means for moving the said pocket structure from its said normal position outwardly through the said slot to bring the said window opening into exposed position exteriorly of said casing, a rotatable dial structure comprising a disk having numerals thereon, said dial structure carried by the said member having a portion of said disk located within the said pocket, said disk being rotatable on a horizontal plane parallel to the base section of said casing for bringing certain of its said numerals towards the said window opening, said pocket structure adapted to be reverted to its said normal position within the said casing, and means for holding the said pocket structure in desired position.

2. In a structure as set forth in claim 1, wherein the said casing is provided with an opening and having a floatable cover structure for covering such opening of said casing, said floatable cover structure forming the weighing platform of said scale.

3. In a structure as set forth in claim 1, wherein the said casing is provided with a floatable frame-structure having an opening, and a movable cover-plate for covering and/or uncovering such opening, said floatable frame structure forming the weighing platform of said scale.

4. In a structure as set forth in claim 1, wherein the said casing is provided with a floatable structure including a pivotal platform, said structure supported by tensioning means located within such casing for urging said platform into movements for weighing purposes.

5. A scale structure comprising a casing having a base section and a floatable platform-cover for weighing purposes, the front portion of said scale structure having a slot, a weighing mechanism within said casing, said mechanism supporting the said platform-cover during weighing operations, a numeral indicating unit, said unit comprising a pocket-member having therein a portion of a rotatable dial, said dial being rotatable on a horizontal plane parallel to said base section, said unit located within the said casing and being interconnected with the said weighing mechanism for being moved laterally relative thereto, for carrying said pocket-member and dial from its normal position within the said casing frontwardly for placing a portion thereof through the said slot to a partially exposed position exteriorly of said casing, said unit adapted to be reverted to said normal position within the said casing, and means for holding said unit in desired position.

6. A scale structure comprising a casing having a base section and a floatable structure, said floatable structure serving as a weighing platform and as a cover for covering said casing, the front portion of said scale structure having a slot, a weighing mechanism located within said casing, a numeral indicating unit comprising a rotatable member carrying a dial thereon, said unit including a pocket-structure housing therein a portion of said dial, said floatable structure having means connectable with said weighing mechanism for moving a portion of such mechanism to urge rotatable movements of said rotatable member to rotate said dial on a horizontal plane parallel to the said base section of said casing, said dial having numerals on its upper face, the upper wall portion of the said pocket structure having a window opening, the said upper face of said dial including the said numerals positionable underneath the said window opening, said unit locatable within said casing and being movable laterally therein relative to the said slot, for carrying the said pocket-structure and dial from its normal position within said casing frontwardly for placing a portion thereof through such slot for having the said window opening and numerals located exteriorly of such casing, said unit adapted to be reverted for carrying the said pocket and dial into said normal position within the said casing, and means for holding said unit in selected position.

7. A scale structure comprising an open casing having a base section and a weighing mechanism and a floatable structure, said floatable structure serving as a weighing platform and as a cover for said open casing, said platform being supported by said mechanism for weighing purposes, said floatable structure movable transversely relative to the said base section during weighing operation, the front portion of said casing having a slot, a numeral indicating unit, said unit comprising a movable carrier having a wall section provided with a window opening including a pointer, a dial having numerals thereon, rotatable means carrying said dial, said dial underlying the said wall section having its numerals located underneath the said window opening for gauging the said pointer to indicate the appropriate weight-numeral, said floatable structure having means connectable said weighing mechanism for moving a portion of such mechanism to urge said rotatable means into rotatable movements to rotate said dial on a horizontal plane parallel to said weighing platform, said rotatable means and said dial in combination with the said wall section adapted to be moved frontwardly through the said slot for placing the said window opening and dial numerals into a position exteriorly of said casing to facilitate the reading of the appropriate weight-numeral, and means forming a part of said casing for holding said unit in selected position.

8. A scale structure comprising a casing having a base section and a floatable-platform for weighing purposes, the front portion of said scale structure having a slot, a weighing mechanism within said casing, said weighing mechanism comprising a movable element provided with teeth portions, a numeral indicating unit, said unit being operated by said weighing mechanism, said unit comprising a receptacle having a portion provided with a window opening including a pointer and carrying a rotatable member provided with teeth sections and with a dial having numerals located underneath said window opening, the teeth portions of said movable element engageable with the teeth sections of said rotatable member for rotating such rotatable member to cause the said dial to be rotated on a horizontal plane parallel to the said section for bringing certain of the dial numerals to the said pointer, said numeral unit movable frontwardly within the said casing for carrying a portion of said unit through the said slot to place the said window opening and dial numerals exteriorly of said casing to facilitate reading of the indicated weight-numerals, said unit adapted to be reverted to carry the said window opening and dial numerals into normal position within the said casing, said casing having means for holding said unit in selected position.

9. A scale structure comprising a casing having a base section and a floatable platform-cover for weighing purposes, the front portion of said scale structure having a spacious slot, said casing containing elements forming a weighing structure and a numeral indicating mechanism, certain of said elements supporting the said floatable platform-cover in its position above the said weighing structure for operating said numeral indicating mechanism, the said numeral indicating mechanism comprising a flat-shaped receptacle provided with a window opening and with a portion of a dial-structure having spaced numerals located underneath such window opening, said dial-structure adapted to be rotated on a horizontal plane parallel to said base section for bringing certain of said numerals towards the said window opening, said receptacle and dial-structure for being moved laterally within the said casing for having a portion thereof placed through the said slot into a position exteriorly of said casing to facilitate reading of the said numerals through said window opening, said receptacle and dial-structure adapted to be moved into normal position within the said casing, said casing having movable means for engagement with said receptacle for holding such receptacle in desired position.

10. A springless scale structure comprising a casing having a base section and wall portions and a floatable top section, said base section for carrying a mechanical weighing mechanism, said mechanism including a rotatable member, said rotatable member carrying a dial provided with numerals, a bar-element, a shaft, a hook-structure, said wall portions provided with means for supporting pivotally said bar-element, said hook-structure and said shaft carried by said bar-element, a weight member carried by said shaft, a plate-element, said plate-element being in contact with said rotatable member, said hook-structure associated with said plate-element, said floatable top having means connectable pivotally with a portion of said shaft and for pressing against said hook-structure for urging said plate-element forwardly to rotate said rotatable member for bringing the proper weight numeral into view.

11. In a structure as set forth in claim 10, wherein the said means of said floatable platform comprises a member of rigid material adapted to be interlocked pivotally with an extended portion of the said shaft for urging counterbalancing action of the said weight-member during weighing operation.

12. In a structure as set forth in claim 10, wherein the said shaft being adjustable into various positions and its weighing member being adjustable into various locations upon said shaft for suitable weighing purposes.

13. In a structure as set forth in claim 10, wherein the said weighing mechanism is provided with a plurality of shaft structures carried by said bar and provided with adjustable weight-members adapted to overlap each other for suitable weighing purposes.

14. A scale implement comprising a structure for carrying a weighing mechanism, said weighing mechanism having a floatable platform for weighing purposes, said mechanism supporting the said floatable platform, said structure supporting pivotally a portion of said mechanism, said portion including hook members each having an opening, a plate having lug-portions and a slotted section, said slotted section having one of its side portions provided with teeth sections, said lug-portions interlocked in a pivotal manner with the said openings, said mechanism having means for carrying a rotatable member, said rotatable member having teeth portions and carrying a dial structure provided with numerals, said teeth portions for engagement with the said teeth sections of the said plate to be rotated thereby for rotating the said dial structure horizontally relative the said scale implement, the said floatable platform adapted to press upon a portion of the said mechanism for urging the said hook members to move the said plate forwardly to rotate the said rotatable member for having the said dial structure bring the appropriate weight-numeral into view and means adapted to hold said dial structure in desired position.

15. A scale implement comprising a structure for carrying a weighing mechanism, said weighing mechanism having a floatable platform, said platform supported by said mechanism for weighing purposes, said mechanism including pivotally movable hook members, a plate having a slotted section, one of the side portions of such slotted section having teeth elements, the said plate and said hook members adapted to become interlocked with each other in a pivotal manner, a carrier, said carrier comprising a rotatable member having teeth portions and carrying a dial structure provided with numerals, a portion of said rotatable member located within the said slotted opening having its teeth portions engaging the teeth elements of such slotted opening, the front portion of said implement having a spacious opening, the said carrier being movable laterally towards the said spacious opening for carrying a portion of the said dial structure through such spacious opening to bring the said numerals to a position exteriorly of said spacious opening, the said floatable platform adapted to press upon a portion of said mechanism for urging the said hook members to move the said plate forwardly to have its teeth elements urging the teeth portions to rotate the said rotatable member for rotating the said dial structure transversely to bring the appropriate weight-numeral into view, said carrier and dial structure being revertable into normal position, and means for holding said dial structure in selected position.

16. A weighing implement comprising a structure for supporting a weighing mechanism, said weighing mechanism including a floatable platform, the front portion of said implement having a spacious opening, a numeral indicating unit, said platform in combination with said weighing mechanism providing means for operating said unit, said unit comprising a rotatable member having teeth portions and carrying a dial-structure having numerals thereon, a plate having a slotted section provided with teeth elements, a carrier, said carrier holding the said rotatable member in position having a portion thereof located within the said slotted section having the said teeth portions engaging the said teeth elements, said carrier being movable laterally for carrying the said rotatable member frontwardly to place a portion of said dial-structure through the said spacious opening for locating the said numerals at the exterior of such spacious opening, said rotatable member for being rotated within the said slotted section during the said lateral movements, said carrier and rotatable member being revertable into normal position, and means operable at the exterior of said implement for holding the said unit in desired position.

17. In a structure as set forth in claim 16, wherein the said implement is provided with means for guiding the said carrier during its lateral movements.

18. In a structure as set forth in claim 16, wherein the said numeral indicating unit comprises a pocket for housing a portion of said dial-structure and wherein the said pocket is provided with a window opening and a pointer for indicating the weight-numeral located upon the said dial-structure.

References Cited by the Examiner

UNITED STATES PATENTS

| | | | |
|---|---|---|---|
| 248,863 | 11/1881 | Hopkins | 177—135 X |
| 1,189,417 | 7/1916 | Zimmerman | 177—180 |
| 1,893,858 | 1/1933 | Carlson | 177—125 |
| 2,107,888 | 2/1938 | Dean | 177—239 X |
| 2,741,473 | 4/1956 | Aylor | 177—239 X |
| 3,101,803 | 8/1963 | Kleinman | 177—217 X |

FOREIGN PATENTS

| | | |
|---|---|---|
| 539,126 | 4/1957 | Canada. |
| 438,129 | 7/1948 | Italy. |

LOUIS J. CAPOZI, *Primary Examiner.*

LEO SMILOW, *Examiner.*

G. J. PORTER, R. S. WARD, *Assistant Examiners.*